US008092305B2

(12) United States Patent
Seelig et al.

(10) Patent No.: US 8,092,305 B2
(45) Date of Patent: Jan. 10, 2012

(54) LIGHTING SYSTEM FOR GAMING DEVICES USING LIGHT EMITTING DIODES HAVING DIFFERENT BEAM ANGLES

(75) Inventors: Jerald C. Seelig, Absecon, NJ (US); Lawrence M. Henshaw, Hammonton, NJ (US)

(73) Assignee: Atlantic City Coin & Slot Service Company, Inc., Pleasantville, NJ (US)

( * ) Notice: Subject to any disclaimer, the term of this patent is extended or adjusted under 35 U.S.C. 154(b) by 882 days.

(21) Appl. No.: 11/744,766

(22) Filed: May 4, 2007

(65) Prior Publication Data

US 2007/0202947 A1 Aug. 30, 2007

Related U.S. Application Data

(63) Continuation-in-part of application No. 10/663,121, filed on Sep. 15, 2003, now Pat. No. 7,232,127.

(51) Int. Cl.
*A63F 9/24* (2006.01)
*A63F 13/00* (2006.01)
*G06F 17/00* (2006.01)
*G06F 19/00* (2011.01)

(52) U.S. Cl. ............................ 463/31; 463/20; 362/253

(58) Field of Classification Search .............. 463/30–33, 463/16–20; 362/23, 29, 30, 253, 254, 800
See application file for complete search history.

(56) References Cited

U.S. PATENT DOCUMENTS 4,621,815 A * 11/1986 Yamamoto ................ 273/143 R
4,711,452 A * 12/1987 Dickinson et al. ........ 273/143 R
5,209,477 A * 5/1993 Heidel et al. .............. 273/143 R
5,284,344 A * 2/1994 Howard .................... 273/143 R
5,388,829 A * 2/1995 Holmes ...................... 273/143 R
5,473,523 A * 12/1995 Von Fange .................... 362/232
5,683,296 A * 11/1997 Rasmussen ..................... 463/20
5,752,881 A * 5/1998 Inoue .............................. 463/20
6,027,115 A * 2/2000 Griswold et al. ......... 273/143 R
6,102,396 A * 8/2000 Liu ........................... 273/143 R
6,129,355 A * 10/2000 Hahn et al. ................ 273/142 R
6,206,781 B1 * 3/2001 Sunaga et al. .................. 463/20
6,315,289 B1 * 11/2001 Sakamoto et al. ........ 273/121 B
6,811,273 B2 * 11/2004 Satoh et al. ..................... 362/27
6,971,760 B2 * 12/2005 Archer et al. ................. 362/101
7,344,442 B2 * 3/2008 Inoue .............................. 463/20
(Continued)

FOREIGN PATENT DOCUMENTS

DE 4100654 A1 * 7/1992
(Continued)

*Primary Examiner* — Milap Shah

(74) *Attorney, Agent, or Firm* — Ian F. Burns & Associates, P.C.

(57) ABSTRACT

A reel device for a gaming machine comprising a chassis configured to support the reel device and a reel structure attached to the chassis. The reel structure has a hub, a frame, and a spoke attached to the hub and the frame. The frame may define the periphery of the reel structure. The periphery of the reel structure may have media adapted to display a symbol to a game player. The reel may further have a board attached to the chassis and a plurality of light-emitting diodes positioned on the board, wherein the plurality of light-emitting diodes may be adapted to transmit light to at least a portion of the media. The light-emitting diodes may have a plurality of beam angles and output power levels.

20 Claims, 14 Drawing Sheets

U.S. PATENT DOCUMENTS

| | | | | |
|---|---|---|---|---|
| 7,380,791 | B2 | 6/2008 | Gauselmann et al. | |
| 2003/0048632 | A1* | 3/2003 | Archer | 362/101 |
| 2003/0193802 | A1* | 10/2003 | Luk | 362/249 |
| 2004/0180716 | A1* | 9/2004 | Seelig et al. | 463/20 |
| 2004/0185926 | A1* | 9/2004 | Emori | 463/16 |
| 2004/0209667 | A1* | 10/2004 | Emori et al. | 463/20 |
| 2004/0209669 | A1* | 10/2004 | Emori et al. | 463/20 |
| 2006/0094511 | A1* | 5/2006 | Roireau | 463/46 |
| 2008/0113747 | A1* | 5/2008 | Williams et al. | 463/20 |
| 2008/0188293 | A1* | 8/2008 | Rasmussen et al. | 463/25 |
| 2009/0149242 | A1* | 6/2009 | Woodard et al. | 463/21 |

FOREIGN PATENT DOCUMENTS

| | | | | |
|---|---|---|---|---|
| DE | 4313200 | C1 | * | 3/1994 |
| JP | 2007215983 | A | * | 8/2007 |

* cited by examiner

LIGHTING SYSTEM FOR GAMING DEVICES USING LIGHT EMITTING DIODES HAVING DIFFERENT BEAM ANGLES

CROSS REFERENCES TO RELATED AND CO-PENDING PATENT APPLICATIONS

This application is a continuation-in-part application of U.S. patent application Ser. No. 10/663,121, filed on Sep. 15, 2003, which claims priority of provisional patent application Ser. No. 60/411,440, filed on Sep. 16, 2002. The contents of both applications are herein incorporated by reference in entirety.

FIELD OF THE INVENTION

This invention relates to gaming devices and, more particularly, to a gaming device that utilizes physical reels.

BACKGROUND

Gaming devices are well known in the art and a large variety of gaming devices have been developed. In general, gaming devices allow users or players to play a game. In many casino-type gaming devices, the outcome of the game depends, at least in part, on a randomly generated event. For example, a gaming device may use a random number generator to generate a random or pseudo-random number. The random number may then be compared to a pre-defined table to determine the outcome of the event. If the random number falls within a certain range of numbers on the table, the player may win a pre-defined prize. The table may also contain display information that allows the gaming device to generate a display that corresponds to the outcome of the game. The gaming device may present the outcome of the game on a large variety of display devices, such as mechanical spinning reels or video screens.

Reel-type gaming devices have been used in gaming for more than one hundred years. Traditional reel-type gaming devices have three mechanical reels that rotate around a common horizontal axis. A reel strip is attached around the circumference of each reel and the reel strips display a plurality of symbols. During normal operation, the reels are spun and stopped to display an outcome of the game. As each reel comes to a stop, a symbol on the circumference of each reel strip is displayed on the front of the gaming device. Some gaming devices indicate a winning outcome by aligning predetermined symbols on one or more pre-determined pay lines.

Gaming devices that are more interesting generate more player interest and excitement. This increased interest and excitement causes players to play longer, which results in more revenue for the game operator. For this purpose, many gaming devices utilize light to enhance their displays and to attract the attention of players. Many different kinds of lights and lighting effects have been developed for gaming devices. While lights have been used in conjunction with gaming devices, a long felt and unmet need exists for an efficient and effective lighting system for reel-type gaming devices.

SUMMARY OF AT LEAST ONE EMBODIMENT OF THE INVENTION

Advantages

The various embodiments of the present invention may, but do not necessarily, achieve one or more of the following advantages:

provide a gaming device that utilizes light-emitting diodes;

provide a reel device that utilizes light-emitting diodes;

provide a reel device that utilizes light-emitting diodes that have various beam angles and output power levels;

provide a reel device that utilizes light-emitting diodes to backlight a flexible belt;

provide a reel device that utilizes different colored light-emitting diodes to convey game information;

provide a reel device that utilizes different colored light-emitting diodes to convey a game outcome;

provide a reel device that utilizes light-emitting diodes that emit light having different wavelengths;

produces less heat than other lighting systems;

provide a lighting system that consumes less power than other gaming devices;

require less service than other lighting systems;

provide game designers more flexibility in designing games and payout events;

provide a visually distinct, but easily understood, gaming display;

provide a gaming device that adds to player excitement and satisfaction; and provide a gaming device that is interesting to a player and results in longer playing time.

These and other advantages of the present invention may be realized by reference to the remaining portions of the specification, claims, and abstract.

Brief Description of At Least One Embodiment of the Present Invention

In at least one embodiment, the present invention is directed to a reel device for a gaming machine comprising a chassis configured to support the reel device and a reel structure attached to the chassis. The reel structure has a hub and a frame. The frame may define the periphery of the reel structure. The periphery of the reel structure may have media adapted to display a symbol to a game player. The reel may further have a board attached to the chassis and a plurality of light-emitting diodes (LEDs) positioned on the board, wherein the plurality of light-emitting diodes may be adapted to transmit light to at least a portion of the media. The light-emitting diodes may have a plurality of beam angles and output power levels.

In at least another embodiment, the present invention is directed to a method of awarding prizes. According to the method, a gaming device may be provided that comprises at least a first mechanical spinning wheel being rotatable about an axis. The wheel may have translucent media. The wheel may have a board mounted inside, the board comprising a plurality of light-emitting diodes. The light-emitting diodes may have a plurality of beam angles and output power levels. A game outcome is determined. The wheel may be rotated, at least a portion of the wheel being viewable by a player. At least a portion of the light-emitting diodes may be illuminated. The mechanical wheel is stopped according to the game outcome. A prize is awarded to the player if the game outcome is a winning event.

The above description sets forth, rather broadly, a summary of one embodiment of the more important features of the present invention so that the detailed description of certain embodiments of the invention that follows may be better understood and contributions of the present invention to the art may be better appreciated. There are, of course, additional features of the invention that will be described below and will form the subject matter of claims. In this respect, before explaining at least one embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF AT LEAST ONE EMBODIMENT OF THE PRESENT INVENTION

In the following detailed description of certain embodiments of the present invention, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Gaming Device

Figure 1:
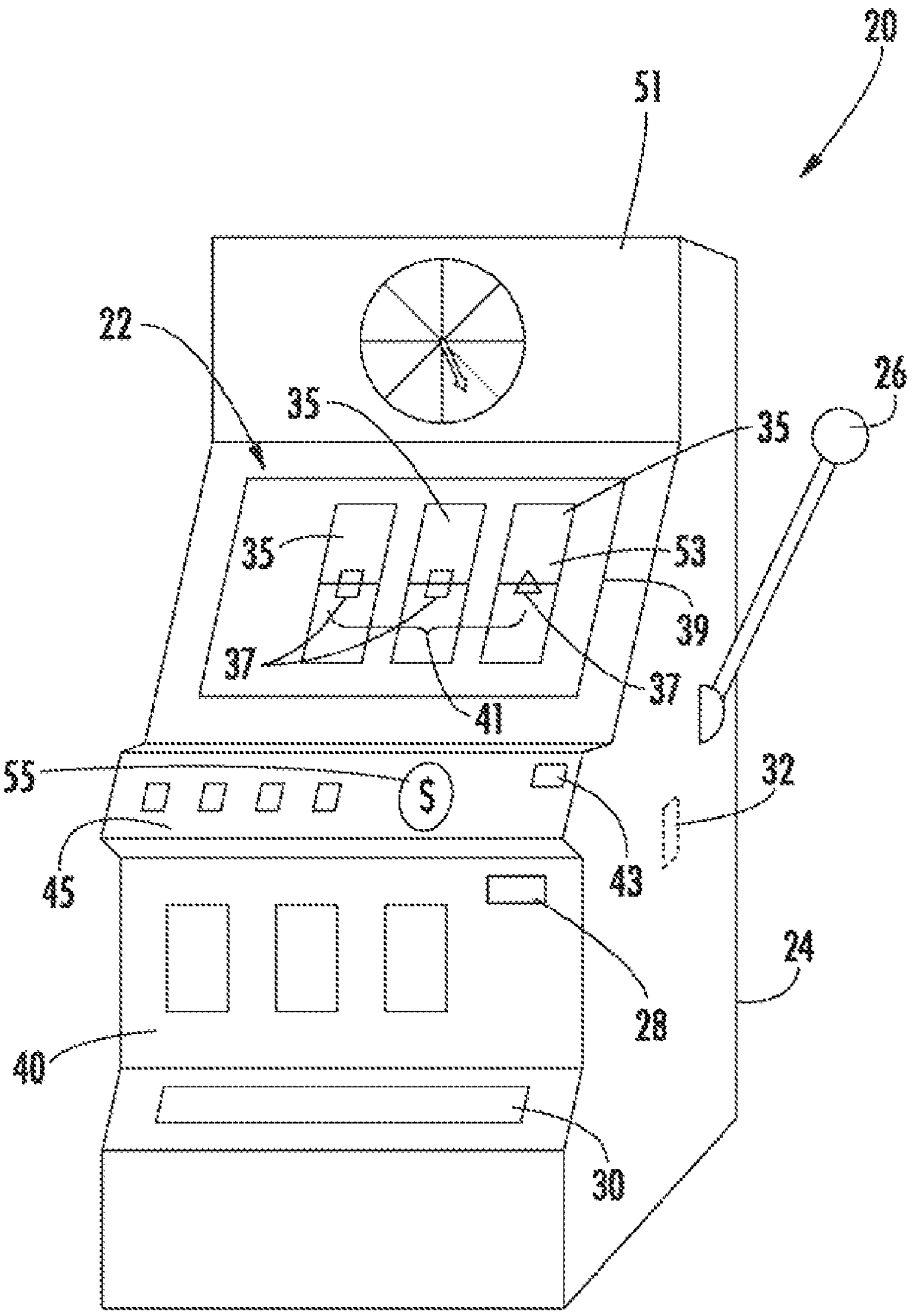
FIG. 1 is substantially an isometric view of a gaming device that utilizes a spinning reel display.

The present invention comprises a lighting system for use with a gaming device. FIG. 1 illustrates a reel-type gaming device 20 known in the art. Gaming device 20 may comprise a case or housing 24, a reel-type game display 22, having a plurality of display sections 35, a handle 26, a value acceptor 28, a coin bin 30, and a game controller 32.

Although display 22 is shown with three display sections 35, a greater or lesser number of sections may be used. At least one symbol or indicium 41 per reel can be displayed to a player, or multiple indicia 41 on each reel can be displayed to a player. For example, a 3×3 matrix of 9 indicia 41 could be displayed. In certain embodiments, each display section 35 displays one reel 37. Alternatively, more or fewer reels could be displayed per display section 35. Display sections 35 could be omitted and all reels 37 displayed in display area 22.

In at least one embodiment of the present invention, each reel 37 has a plurality of indicia 41 appearing on the outer surface of the reel. The combinations of indicia 41 displayed to the player determine winning and losing combinations. A pay line 39 may be added to the display to aid the player in seeing the alignment of indicia 41 used to determine whether the player has won.

A case or housing 24 may hold gaming device components. A value acceptor 28 may accept various forms of value, including cash and coins, from a game player. The value acceptor may accept tokens, paper currency, magnetic cards, and vouchers. A coin bin 30 may hold coins that may be dispensed after a winning event has occurred.

Gaming device 20 may include wager input means, such as buttons 45, for a player to input a wager to be played on a particular round of game play. Handle 26 may be used by the player to initiate play on gaming device 20. Handle 26 may be pulled by the player to start the game. Other input devices, such as a button 43, may also be provided for initiating play.

Once a game is activated, reels 37 spin or rotate around a common, usually horizontal, rotational axis (not shown). Controller 32 determines a game outcome and causes reels 37 to display the appropriate symbols or indicia 41 in sections 35. A winning combination or arrangement of symbols 41 may correspond to a display on a pay table 40. If the combination determined by controller 32 is a winning outcome, the player is awarded a prize.

Display area 22 may comprise a primary game. Gaming device 20 may also include a bonus game 51. The bonus game may be triggered by a bonus activating event, as is known in the art, such as the display of a particular symbol 53 on reel 37. The bonus game may entitle a player to such prizes as additional monetary prizes, goods and/or services, or a bonus multiplier by which a player's winnings are multiplied. The bonus game may be activated by a separate input device, such as a button 55, or could be activated by the same means used to activate the primary game, including buttons 45 and/or handle 26.

Figure 2:
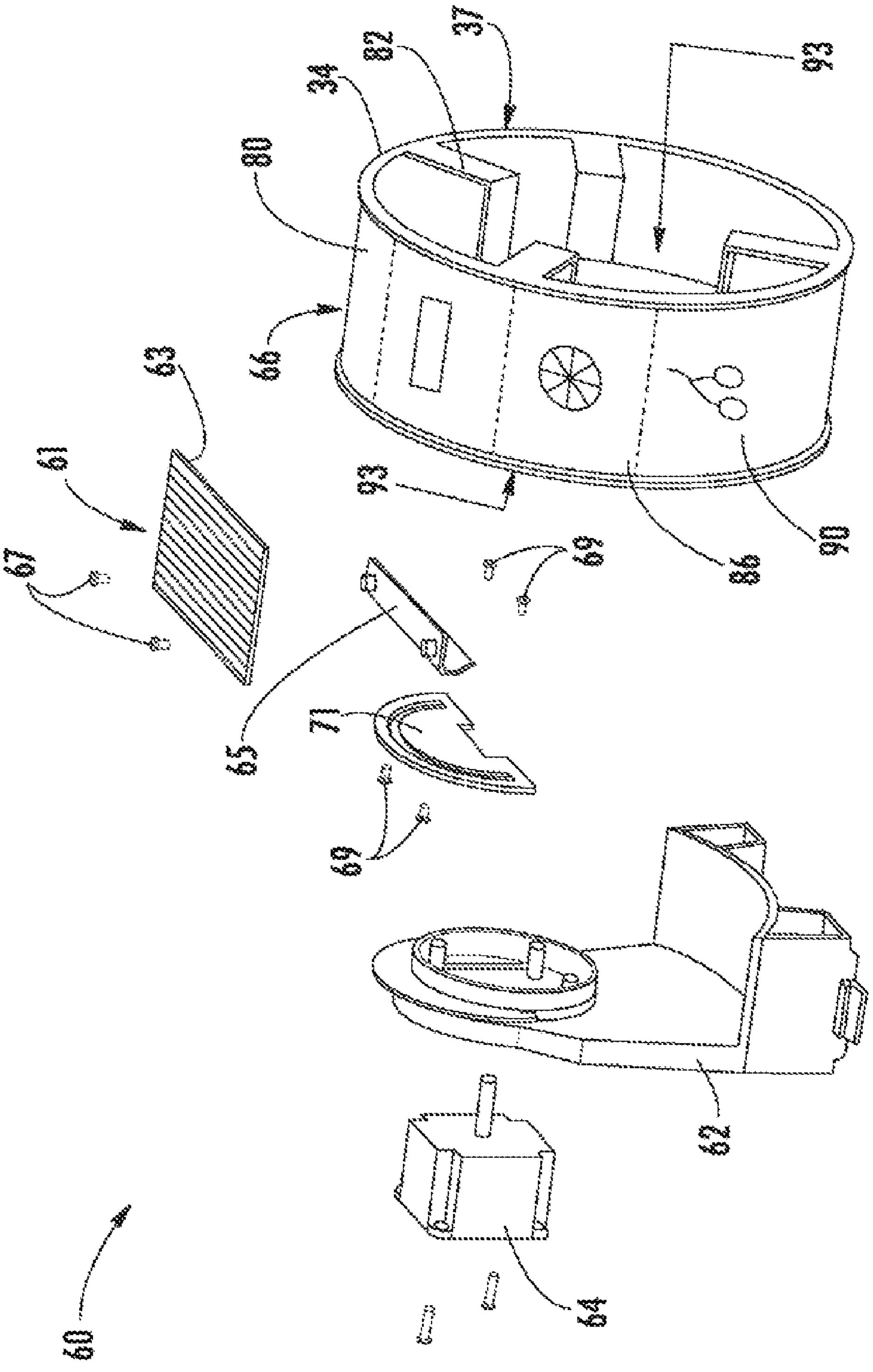
FIG. 2 is substantially an exploded view of an embodiment of a lighting system of the present invention.
Figure 3:
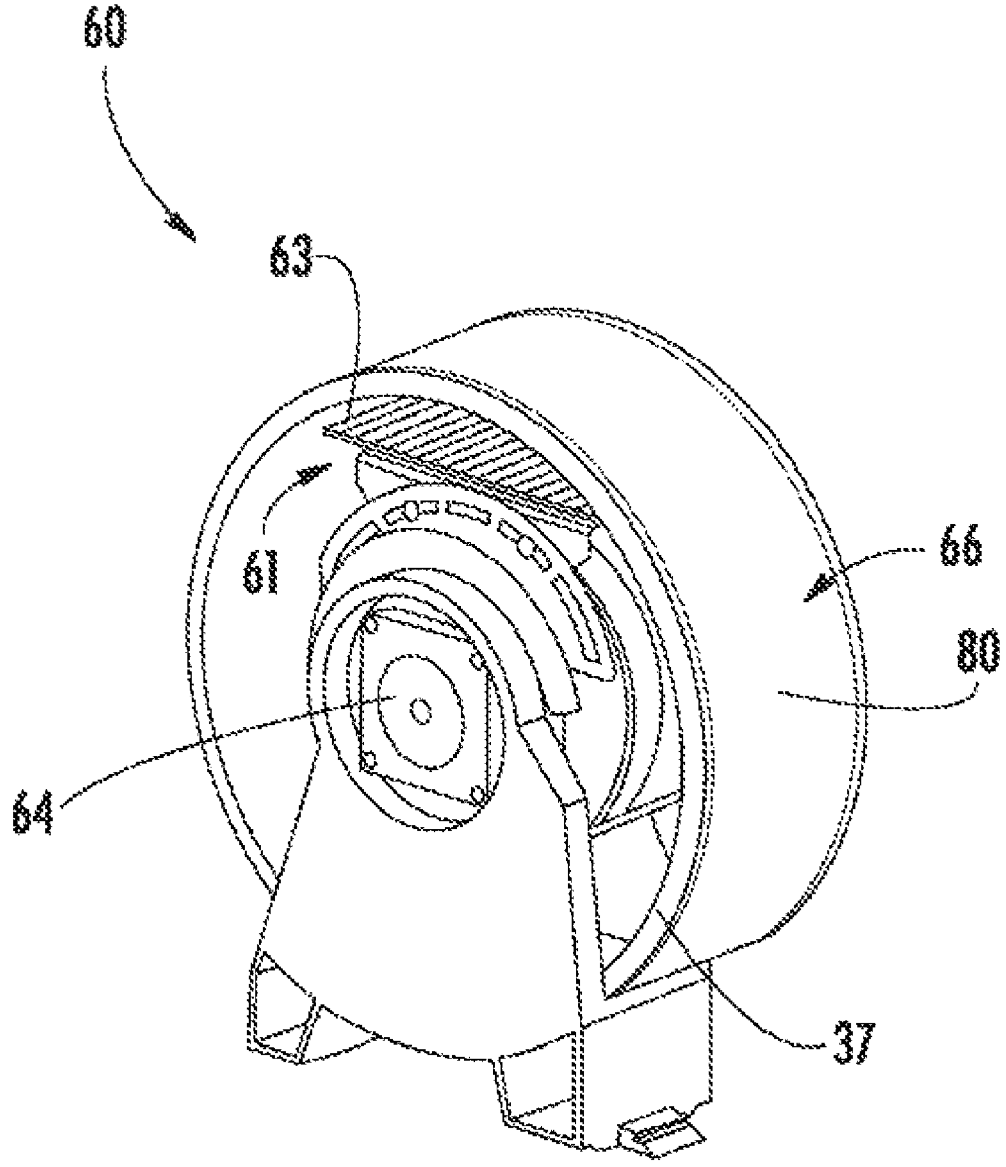
FIG. 3 is substantially a perspective view of the lighting system of FIG. 2.

FIGS. 2 and 3 show a reel device 60. Reel device 60 may comprise a chassis 62, a reel light assembly 61, and a reel 37 rotatably attached to the chassis 62. Reel 37 may have a hub (not shown) and a frame. The frame may define the periphery of reel 37 and a reel circumference 66. Reel 37 may further have at least one spoke 82. A media strip, or reel strip, 80 may be attached to reel circumference 66. Media strip 80 may have sections 86 showing various types of images, such as symbols 90.

Media strip 80 may be attached by various types of adhesives. Alternatively, the frame of reel 37 may be constructed to hold media strip 80. For example, the outer portion of the frame may be formed into slots configured to hold media strip 80. Of course, other means of attachment could be used without departing from the scope of the present invention. Media strip 80 may be made of any suitable material, including plastic films and the like. It may be desirable for at least a portion of media strip 80 to be at least partially translucent, in order to allow light to pass through. Of course the extent and degree of translucency, transparency, or opacity may be selected as desired by the art worker and still fall within the scope of the present invention.

The present invention is not limited to reels 37 containing media strips. For example, reels 37 may be constructed so that a portion functioning similarly to media strip 80 is integrally formed in reels 37. In addition, media strip 80, or its equivalent, is not limited to any particular shape or size. Media strip 80, or its equivalent, may be mounted to a face side 93 of reel 37. Media strip 80, or its equivalent, need not extend the entire length of reel circumference 66 or cover the entire face side 93 of reel 37.

Reel light assembly 61 may have a board 63. Board 63 may be attached to chassis 62 by a bracket 65 or other fasteners known in the art. Connectors 67 and 69, which may be screws, pins, or other connectors known to the art, may affix board 63 to bracket 65. Bracket 65 attaches may attach to a bracket base 71, which may attach to chassis 62. Board 63 may be positioned underneath media strip 80. Board 63 may be positioned to face the front of display 22 (FIG. 1).

Figure 4:
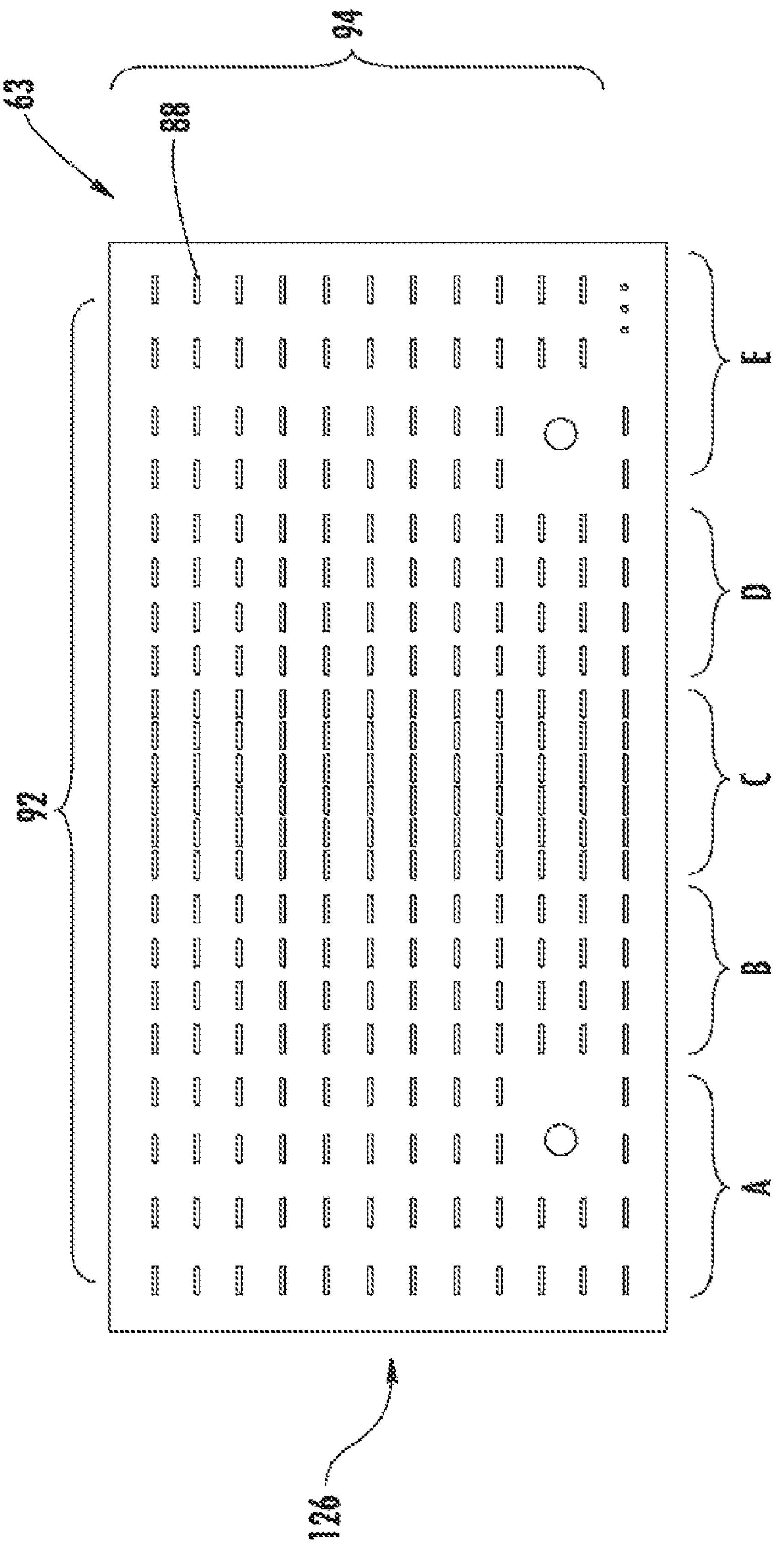
FIG. 4 is substantially a front elevational view of an LED board.
Figure 5A:
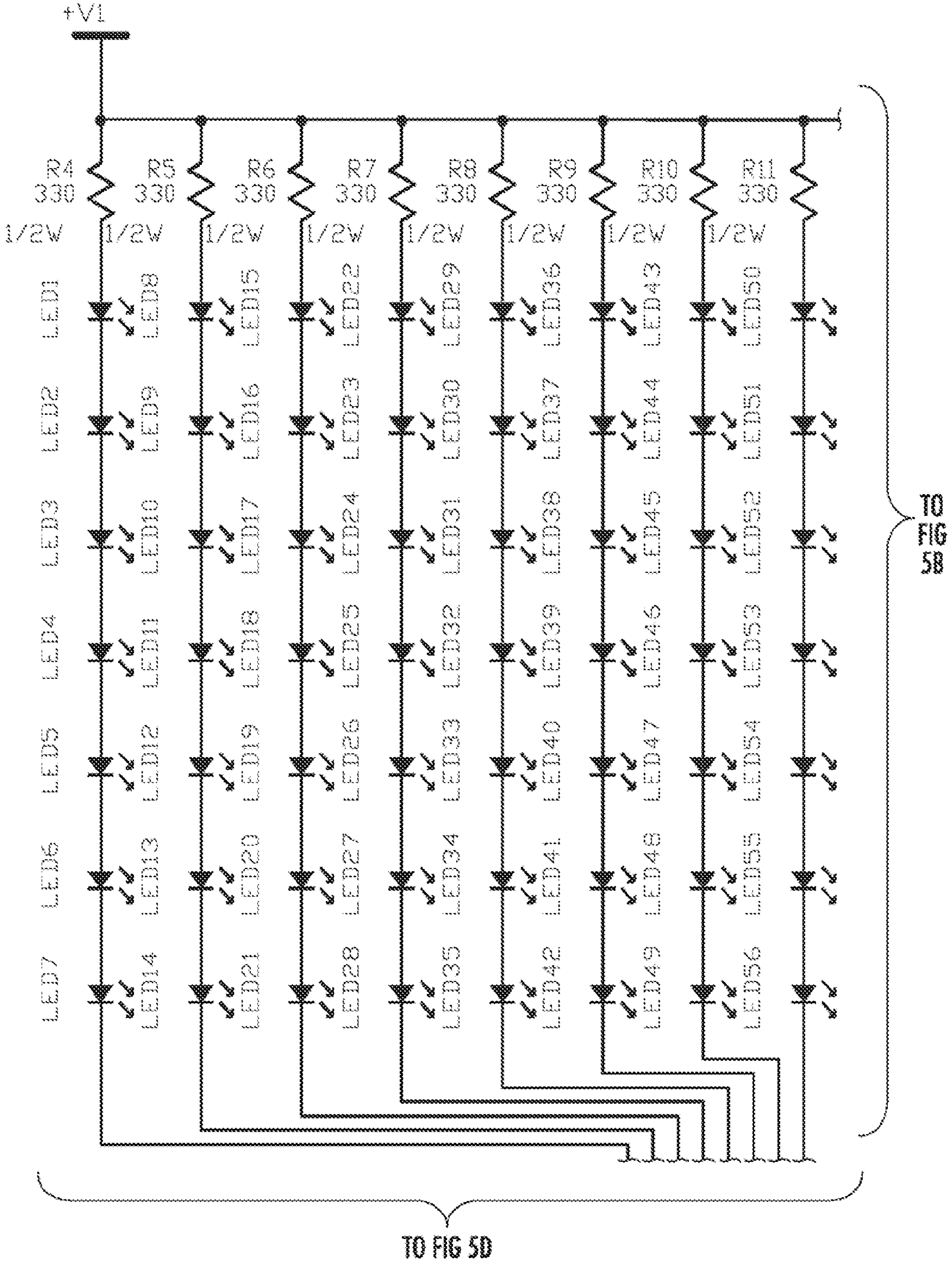
FIGS. 5A through 5E are substantially a schematic diagram of an electrical circuit for driving the light-emitting diodes.
Figure 5B:
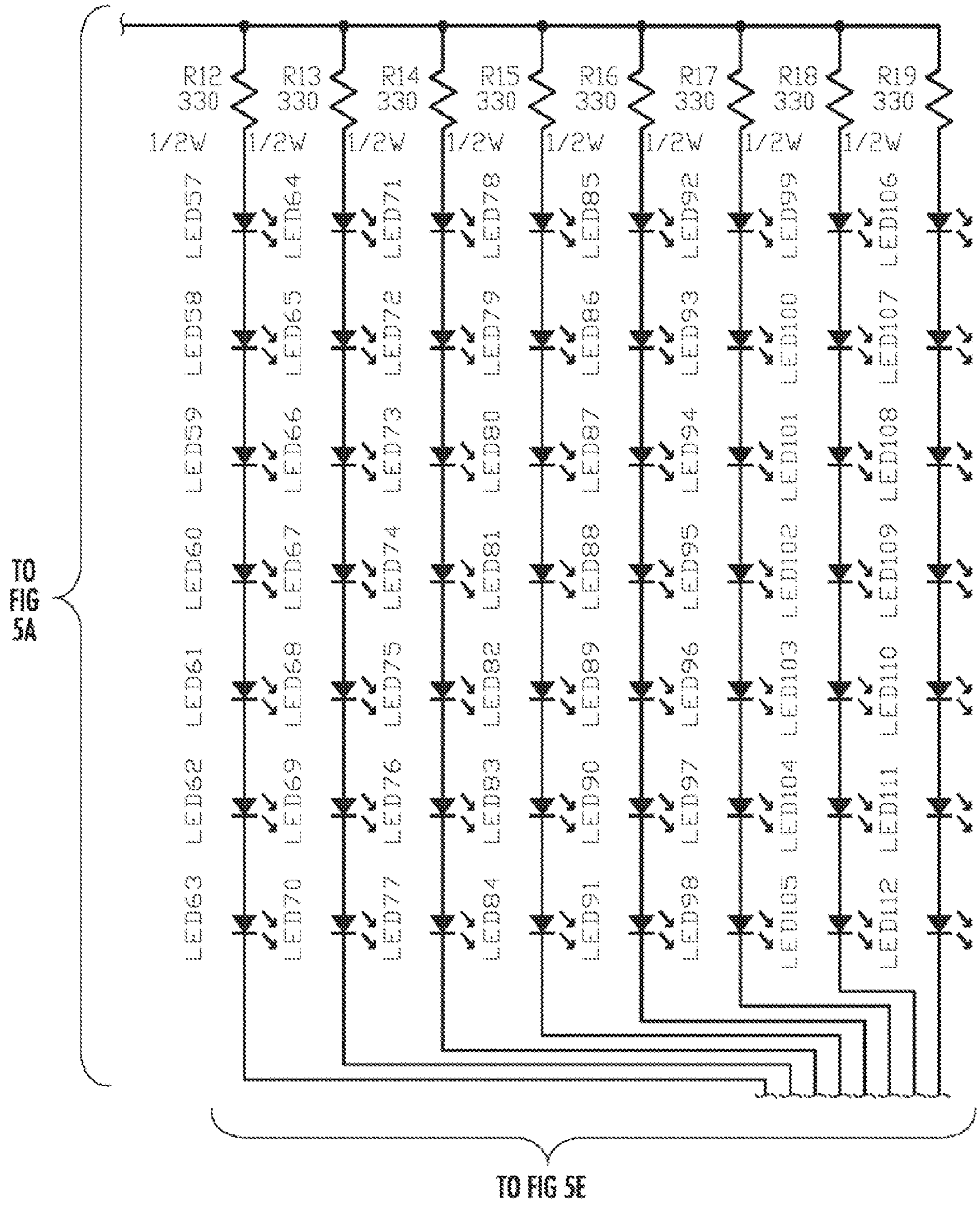
Figure 5C:
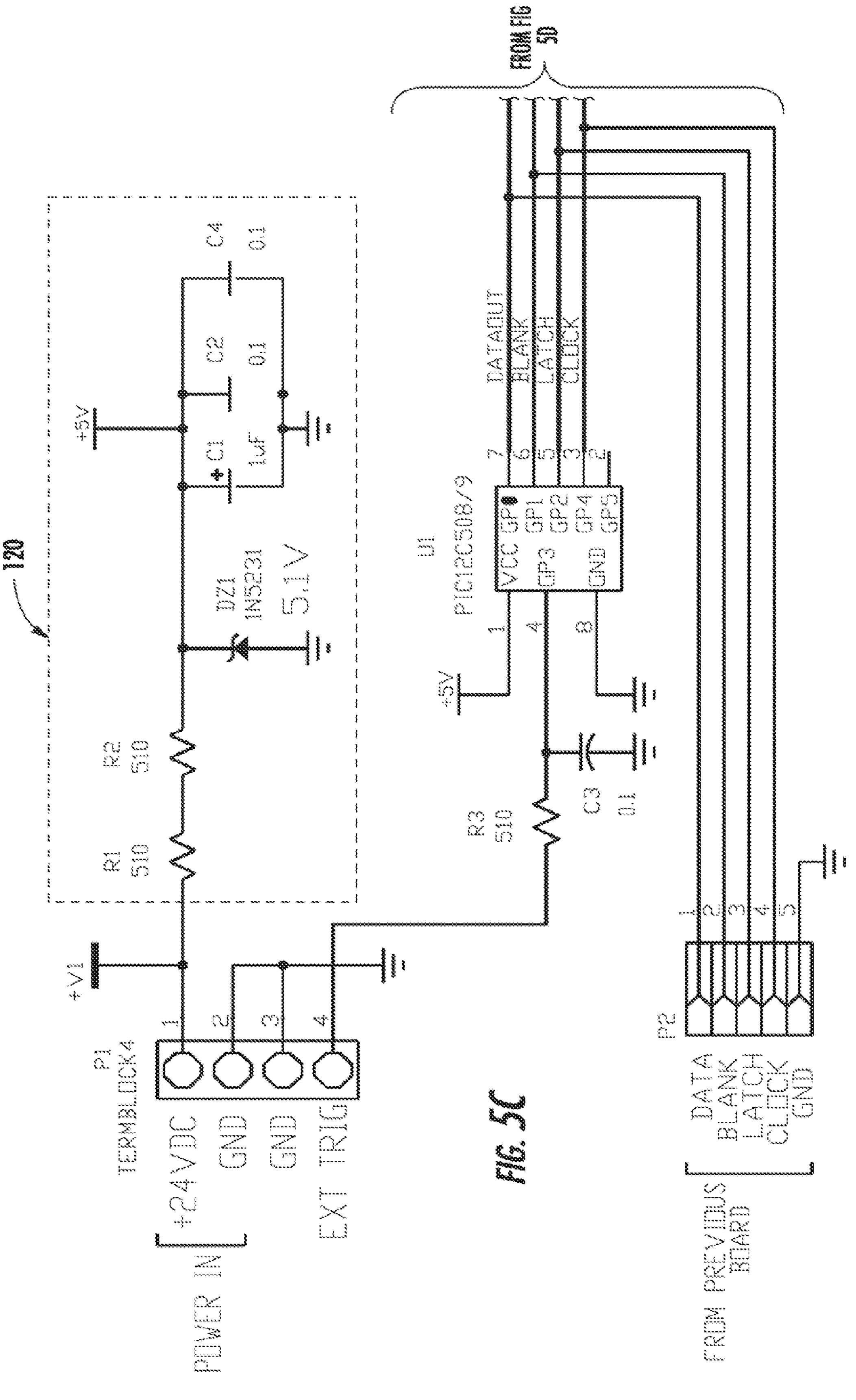
Figure 5D:
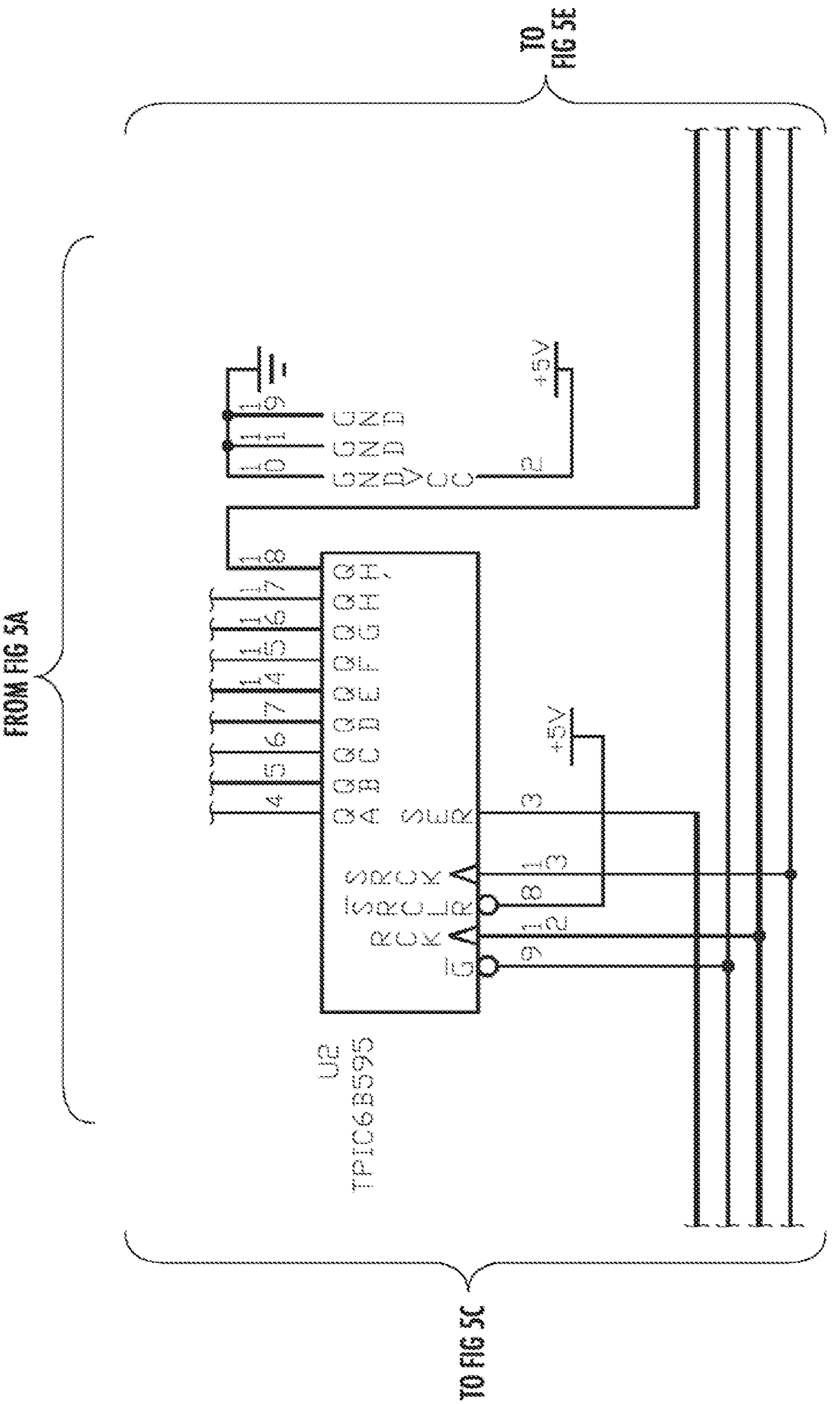
Figure 5E:
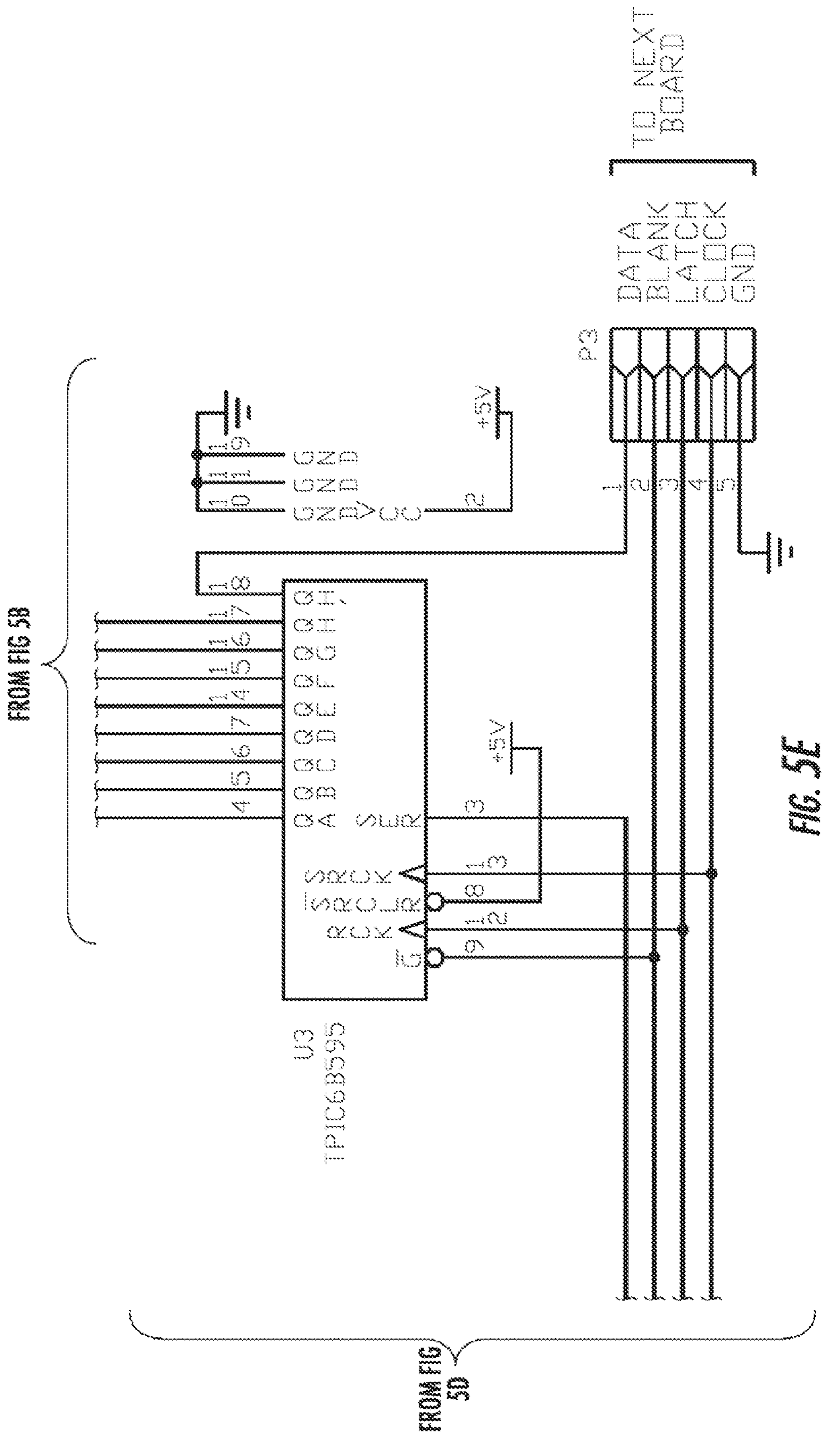

Referring now to FIG. 4, board 63 may be adapted to hold a plurality of light-emitting diodes (LEDs) 88. LEDs 88 may shine light on media strip 80 (FIGS. 2 and 3), and may provide a variety of visual presentations and effects on media strip 80. LEDs 88 may be selected to emit light in several different wavelengths, resulting in different colors of light. LEDs 88 may be individually illuminated by a power source or may be illuminated together. LEDs 88 may be directed to illuminate or display a letter, a symbol, a number, a character, or other indicia or images. LEDs 88 can be made to flash or create other visual effects. LEDs 88 suitable for use in the present invention may be commercially available from LED Effects, Inc., Rancho Cordova, Calif.

LEDs 88 may be arranged in rows 92 and columns 94 to define a matrix 126. Board 63 and matrix 126 may be divided into matrix portions A through E. Matrix portions A through E may have varying densities of LEDs 88. For example, matrix portion C may have the highest density of LEDs 88, matrix portion B may have an intermediate density of LEDs 88, and matrix portion A may have a comparatively lower LED 88 density.

Arrangements and numbers of LEDs 88 may vary. Densities of LEDs 88 may vary, and positions and sizes of matrix portions may vary. Increased LED density may allow for brighter displays. In addition, higher LED densities may allow for more detailed displays to be presented to a player. By combining regions of higher and lower LED density, a variety of display options are available. Arrangements of LEDs and densities of LEDs may be configured according to a desired display or visual effect on media strip 80. With LEDs, because of the great variety of options in selecting and configuring the quantity, types, colors, densities, arrangements, and other variables, visual effects or presentations may be conducted in a smooth and visually appealing manner.

LEDs emit light with substantially less radiant heat than fluorescent or incandescent light sources. Creating a matrix of incandescent bulbs, or other non-LED light sources, may generate inappropriate levels of heat that could damage other game components. In addition, LEDs use less power that other light sources and may reduce the game proprietor's overhead expenditures. Similarly, LEDs typically last longer and are more durable than other light sources, including fluorescent lights. This durability and longevity may reduce the amount of money spent on replacement parts, service calls, and revenue lost due to out of service machines.

The LEDs used in the present invention may emit light at a single wavelength or at multiple wavelengths. Obviously, the type of LEDs used may have a significant impact on the construction and operation of board 63. For example, if single-color LEDs are used, an appropriate number of LEDs of each desired color needs to be placed on the surface of board 63, crowding the surface and limiting the brightness and resolution of any one color. If LEDs are used that can emit light at multiple wavelengths, the LED density can be configured without regard to color, the color of each LED being controllable by a controller, such as controller 32 (FIG. 1).

LEDs for use in the present invention may be conventional LEDs, such as those made from indium gallium arsenide or gallium nitride. Organic light-emitting diodes (OLEDs) may also be used, particularly when it is desired to have LEDs capable of emitting at multiple wavelengths. Those of skill in the art will be able to select appropriate LEDs for use in a particular application, as well as to design LED boards having appropriate configurations of LEDs.

Conductive regions (not shown) may be provided on board 63 for supplying electrical current to LEDs 88. These regions may be provided using printed circuit board technology that is well known in the art. These conductive regions can be arranged so that individual LEDs can be activated. Alternatively, the conductive regions may be arranged to activate individual rows or columns of LEDs.

Referring back to FIGS. 2 and 3, a reel motor 64 (FIG. 3) may also be provided on chassis 62 for rotating reel 37. Reel motor 64 may be any motor typically used in gaming machines, other suitable motors known in the art, or subsequently developed motors. In at least one embodiment, reel motor 64 is a stepper motor. Reel motor 64 is typically connected to controller 32 (shown in FIG. 1) to controllably stop the reel rotation.

Controller 32 may be in communication, including being electrically connected, with board 63, and therefore the light-emitting diodes LEDs 88, by a cable or wire harness (not shown). Controller 32 may provide the necessary voltage to cause the light-emitting diodes to emit light. Controller 32 may also cause different light-emitting diodes to emit light at different times. For example, a blue LED can be on for one time period, then a green LED for a second time period and then a red LED for a third time period. The different time periods may be sequential, overlapping, or simultaneous. In addition, when multiple wavelength LEDs are used, controller 32 may control the wavelength at which each LED emits. Of course, controller 32 could control a secondary controller that would directly control LEDs 88 in response to signals received from controller 32. A suitable controller for this use is a GAM 2000 controller manufactured by Eagle Engineering of Pottstown, Pa. Of course, many other controllers, now known or yet to be developed, could be used without departing from the scope of the present invention.

Turning now to FIGS. 5A-5E, a schematic diagram of at least a portion of one embodiment of controller 32 and board 63 is shown. Controller 32 may be adapted to control the operation of the light-emitting diodes 88. Controller 32 may comprise integrated circuits U1, U2, and U3, and a 5 volt power supply 120. Integrated circuits U2 and U3 are 8-bit shift registers. U2 and U3 contain an 8-bit serial-in, parallel-out shift register that feeds an 8-bit D-type storage register. Integrated circuit U1 is a 4-bit microcontroller. Integrated circuits U2 and U3 are connected to the matrix 126 of LEDs 88. Resistors R4-R19 (FIGS. 5A and 5B) are connected between each row of the LEDs and 24 volts DC. Microcontroller integrated circuit U1 may be programmed to turn on rows of LEDs 92 (FIG. 4) in a pre-determined sequence for a predetermined period of time. Controller 32 may be chained together to control more matrices 126 of LEDs using connectors P2 and P3. A connector PI provides a connection from the microcontroller integrated circuit U1 to power, ground, and an external trigger. Power supply 120 provides power to integrated circuits U1, U2, and U3.

Controller 32 may provide the necessary voltage to cause the light-emitting diodes to emit light. Controller 32 may also allow different color LEDs to emit light at different times. As media strip 80 is rotated with reel 37 (FIGS. 2 and 3), controller 32 (FIG. 1) may selectively illuminate various LEDs 88.

Methods of Using Backlit Reels

Backlighting reels 37 using board 63 (FIGS. 2-4) provides many possibilities for developing new gaming devices and methods. These possibilities range from using LEDs in place of traditional light sources, using LEDs to create interesting lighting and "animation" effects, and using colored LEDs in gaming methods.

LED Illumination

In at least one embodiment, backlit reels 37 may be used to create an LED-illuminated version of a typical slot machine display. That is, the media strip 80 (FIGS. 2 and 3) located on the reels 37 (FIGS. 1-3) may be made of a material that transmits light from the LEDs in the center of the reels through to the outside of the reels (i.e. media strip 80 is translucent, to some degree). Media strip 80 may have a plurality of different sections 86, each section bearing an indicia or symbols 90 (FIG. 2).

As has already been discussed, using LEDs to illuminate reels 37 has many advantages over more traditional light sources, such as incandescent bulbs. The advantages include lower heat production and lower energy consumption. Another advantage is the longevity and durability of LEDs.

Lighting Effects and Animation

The nature of the LEDs allows for much greater variety in how illumination is used in the gaming device and how it can be incorporated into gaming methods. As has already been discussed, board 63 (FIGS. 2-4) may have varying densities of LEDs. The LEDs can be arranged on board 63 to create desired lighting effects. For example, lower LED densities may be used at the edges of board 63 and higher densities at the middle, allowing symbols 90 (FIG. 2) on media strip 80 (FIGS. 2 and 3) to appear to fade in and out of view.

It is possible to create custom illumination patterns to illuminate media strips 80, or even create illumination patterns that are tailored to each symbol 90. For example, if a particular indicium 90 has a particular shape, such as the number "7," LEDs 88 (FIG. 4) could be set to illuminate in the pattern of a "7." This custom illumination creates a visually distinct look for the gaming apparatus and draws more attention to the symbols appearing on media strip 80.

As another example, many gaming machines contain special symbols that indicate a jackpot prize, a bonus prize, a progressive prize, or a symbol 90 entitling a player to play a bonus game. The ability to win these special prizes is often a key motivation for players to play a particular gaming machine. It may be desirable to highlight the special symbol or symbols that award these prizes.

One way attention can be drawn to special symbols is by adjusting the illumination level of board 63 depending on what symbol 90 is being displayed to the player. A standard symbol might be displayed at a first illumination level. A symbol entitling a player to play a bonus round might be illuminated at a second illumination level that is brighter than the first illumination level. A jackpot or progressive prize might be illuminated at a third, brighter illumination level.

In addition to custom display patterns and custom illumination levels, board 63 can be used to add "animation" type effects to the game display. For example, when the number "7" is displayed, LEDs 88 could be made to illuminate from the bottom of the "7" to the top. Symbols 90 might be made to appear to flash.

These animations can be independent of an underlying game or can be tied to game events. For example, if the combination of three "7"s results in a jackpot prize, a first "7" appearing on a pay line might appear at a first illumination level, a second "7" might cause both "7"s to be more brightly illuminated, while a winning combination of three "7"s may be made to appear to flash. In addition, animated effects may be configured to display over more than one reel. For example, an animation might appear to start on one reel and carry over to another reel.

Colored LEDs

In place of, or in addition to, the previously mentioned uses of LEDs 88 (FIG. 4), board 63 (FIGS. 2-4) may include a variety of colored LEDs 88, or have LEDs 88 emitting at multiple wavelengths, and can create additional game play possibilities and opportunities to create a visually distinct gaming machine. In one embodiment, board 63 might be configured to display different colors as media strip 80 (FIGS. 2 and 3) rotates with reel 37 (FIGS. 1-3). The changing colors need not be correlated to any gaming function or be associated with a particular game outcome. Compared to traditionally illuminated machines, the changing colored display has a visually unique appearance and may attract and retain game players.

The colors displayed by LEDs 88 may be correlated to various game play factors. For example, media strip 80 may include a variety of symbols 90 (FIG. 2), the meaning of which may be influenced by the colors displayed by LEDs 88. In one embodiment, symbols 90 appearing on media strip 80 are substantially uncolored, such as being white or clear. As a non-limiting example, media strip 80 may contain one or more symbols 90 that are "7"s and are a translucent white when un-illuminated. When the game or a certain reel is not active, the symbols may appear to be white.

When a game is initiated, a random number generator associated with controller 32 may determine the outcome. The outcome may indicate the "7" appearing on center reel 37 will be red. As reels 37 rotate, LEDs 88 may alternate the color of one or more "7"s appearing on media strip 80 associated with center reel 37. In this way, a player does not know what the color of the "7" will be at the game's conclusion, creating an element of suspense. When center reel 37 is stopped, LEDs 88 will display the color initially determined as the outcome by controller 32, in this case, the "7" displayed by center reel 37 would be illuminated red.

In the above embodiment, the player would see an uncolored, possibly un-illuminated display. Once game play has begun, reels 37 may be illuminated a variety of colors. At the game's conclusion, one color may be solidly illuminated for each reel. The solidly illuminated color would correspond to the game outcome.

It should be noted that a variety of symbols 90 can be used on media strip 80, or merely different colors or presentations of one symbol For example, a game may be developed where winning and losing combinations are determined by various combinations of colored symbols.

Color could also indicate things such as multiplier values. In one embodiment, the color displayed by LEDs 88 may be tied to the number of credits played by a player in a particular game round. For example, it is common for payout amounts to be tied to the number of credits played by a player. A one credit wager may result in a 1× payout, two credits may result in a 2× payout, three credits may result in a 3× payout, etc. In addition, certain jackpot prizes are often only obtainable by playing the maximum credits on the device. A normally lighted display might be used for a 1× multiplier, a green display for a 2× multiplier, and a red display for a 3×, or maximum, multiplier. The use of such a color scheme provides information to the player while also creating a unique look for the gaming device. Of course, the above example is merely illustrative and the present invention is not limited to indicating multiplier values, much less any particular multiplier value or color scheme.

Some bonus games award the player a multiplier by which their prize is multiplied. Color can be used for these multipliers in an analogous manner to that described for coin-based multipliers.

Some gaming devices allow a player to choose to play multiple pay lines. For example, some slot machines have three reels which may each display three symbols, resulting in a 3×3 matrix. Pay lines can be provided along the various rows, columns, and diagonals of the matrix. Color can be used in at least two different ways, explained below.

First, color can be used to show which pay lines are active. In one embodiment, media strips 80 are white, or otherwise transparent or translucent, such that the images appearing on media strips 80 are not substantially visible when they are not being illuminated by board 63. When a particular pay line is in play, the portion of board 63 illuminating symbols along the pay line can be activated. When multiple pay lines are active, each pay line may be presented in a different color to aid the player in determining wining combinations.

In addition, or alternatively, color can be used at the conclusion of a game round in order to help the player identify pay lines that have resulted in a winning event. For example, while the reels are spinning, all of the LEDs may be lit white. When the reels stop, winning pay lines could be illuminated in red.

In an alternative embodiment, representations formed by lighting selected LEDs 88 on board 63 can substantially or totally replace symbols 90 on media strip 80. For example, media strip 80 could be a substantially translucent white film and may have a plurality of different sections 86 (FIG. 2). As media strip 80 is rotated about board 63, LEDs 88 may project light onto media strip 80, forming a variety of images and may imitate a traditional spinning reel.

Color may also be used to indicate that a player is entitled to a bonus, or is entitled to play a bonus game. For example, the appearance of an uncolored symbol might indicate a non-winning event, or a normal payout. The game may be configured such that the appearance of the same symbol, but displayed in a particular color, entitles the player to a bonus award or to play a bonus game. Of course, the bonus could also be triggered by a colored symbol in combination with other colored or uncolored symbols appearing on other reels.

It will be appreciated by those of skill in the art that the present invention is advantageous because it greatly increases the range of options available to game designers. Previously, game designers would typically need to include more reels, display more symbols, or add additional display elements in order to add new elements or additional winning combinations to gaming devices. Although the games may serve to increase player interest, there is always the possibility that too complicated a presentation might actually discourage players from playing the games. By using a relatively simple, easily assimilated game modification—color—many new game play elements can be added to a relatively simple gaming device, increasing the variety of game play options available to a player, while maintaining a coherent presentation.

The following is an example of how color can increase the flexibility of a game. On a mechanical slot machine having 22 indicia per reel, and three reels, there are a total of 10,648 different combinations of symbols. The addition of just one color increases the number of indicia per reel to 44 (22 indicia, each possibility appearing in one of two colors) and the total number of combinations to 85,184. The addition of the extra colors may allow game operators to create relatively large prizes with relatively small odds of occurring. Of course, a greater number of smaller payouts may be included. The color displayed by LEDs 88 may be determined by a random number generator associated with controller 32.

Of course, many different variations of the present invention may be used without departing from the scope of the invention. For example, different combinations of colors, animation effects, and LED lighting could be used. All reels could be similarly illuminated, or different illumination schemes could be used for each reel. Similarly, the methods and apparatus of the present invention may find application in areas beyond gaming, and for gaming machines other than reel type slot machines.

Figure 6:
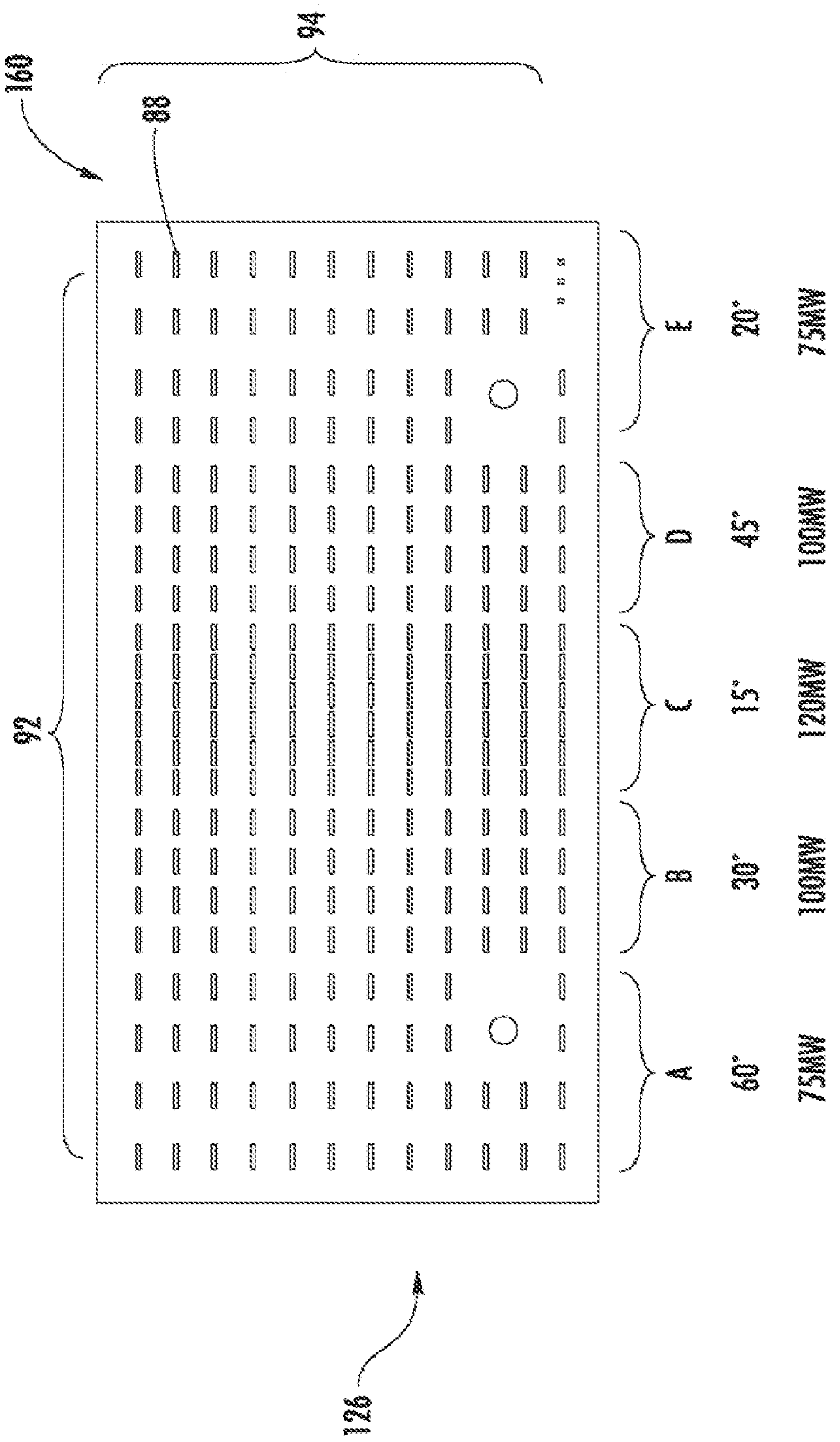
FIG. 6 is substantially a front elevational view of an LED board having various light-emitting diode beam angles and output power levels.
Figure 7:
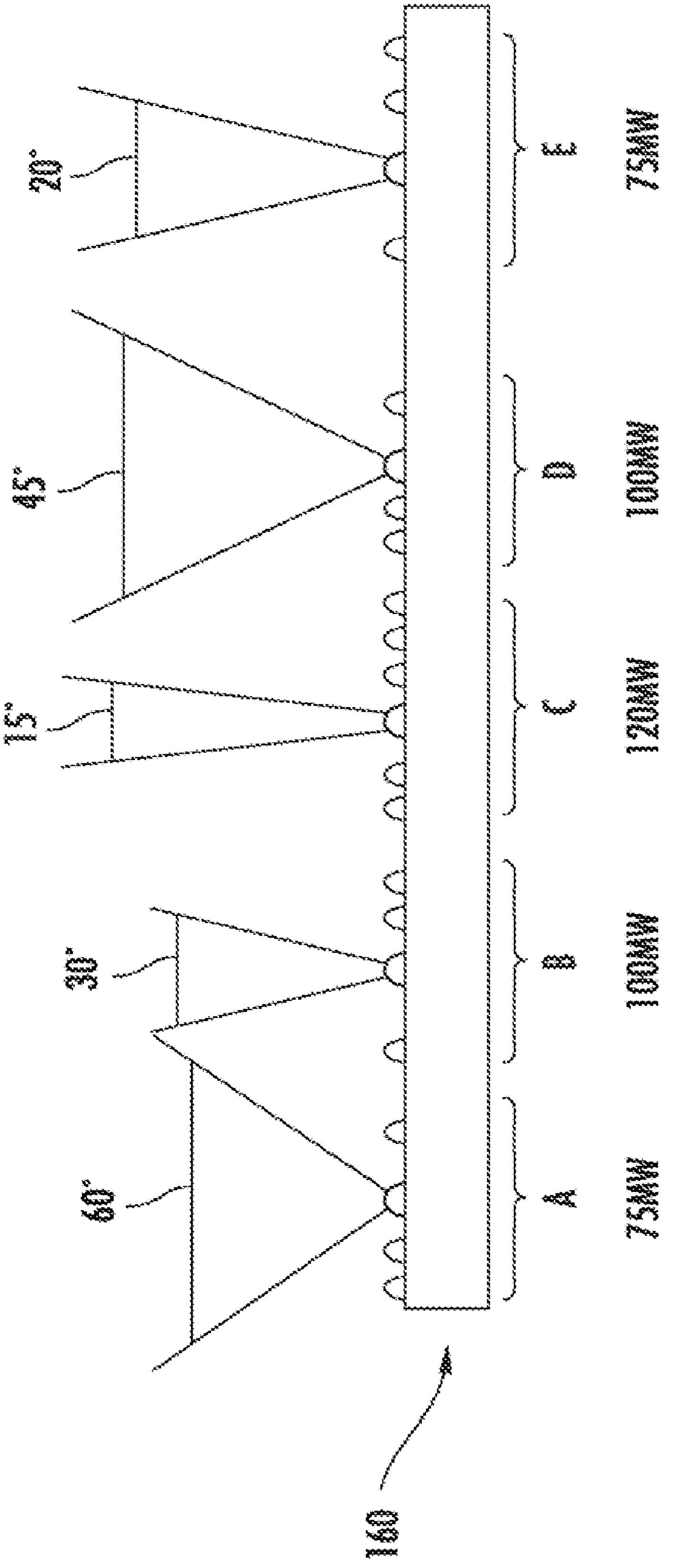
FIG. 7 is substantially a side view of the LED board in FIG. 6.

Lighting Effects Using Light-Emitting Diodes Having Various Beam Angles and Output Powers The nature of the LEDs allows for much greater variety in how illumination is used in the gaming device and how it can be incorporated into gaming methods. With reference now to FIGS. 6 and 7, board 160 is shown having light-emitting diodes with various beam angles and output powers. Board 160 is similar to board 63 (FIG. 4) previously described and can be used with reel device 60 (FIGS. 2 and 3).

LEDs 88 may be arranged in rows 92 and columns 94 to define a matrix 126. Board 160 may be divided into matrix portions A through E. Matrix portions A through E may have various beam angles and output powers. For example, matrix portion C may have LEDs 88 with a beam angle of 15 degrees and an output power of 120 milliwatts. Matrix portion B may have may have LEDs 88 with a beam angle of 30 degrees and an output power of 100 milliwatts. Matrix portion D may have may have LEDs 88 with a beam angle of 45 degrees and an output power of 100 milliwatts. Matrix portion A may have may have LEDs 88 with a beam angle of 60 degrees and an output power of 75 milliwatts. Matrix portion E may have may have LEDs 88 with a beam angle of 20 degrees and an output power of 75 milliwatts.

Matrix portions A through E may have various densities of LEDs 88 or may have the same density of LEDs 88 across board 160. The use of various beam angles and powers of LEDs 88 may create the same effects as having varying densities of the same output power and beam angle of LEDs. The arrangements and numbers of LEDs 88 may vary. Densities of LEDs 88 may vary, and numbers, positions and sizes of the matrix portions may vary. The use of various beam angles and output powers of LEDs 88, may allow for more detailed displays with sophisticated lighting effects to be presented to a player. By combining regions of higher and lower output power LEDs and higher and lower beam angle LEDs, a variety of display options are available to create visual effects on media strip 80 (FIGS. 2 and 3). With LEDs, because of the great variety of options in selecting and configuring the quantity, types, colors, densities, arrangements, and other variables, visual effects or presentations may be conducted in a smooth and visually appealing manner.

The LEDs can be arranged on board 160 to create desired lighting effects. For example, using wider beam angles and lower output power LEDs at the edges of board 160 and smaller beam angles and higher output power LEDs in the middle can allow symbols 90 (FIG. 2) on media strip 80 to appear to fade in and out of view.

It is possible to create custom illumination patterns to illuminate media strips 80, or even create illumination patterns that are tailored to each symbol 90. For example, if a particular symbol 90 has a particular shape, only a portion or the outline of the symbol can be illuminated. This custom illumination creates a visually distinct look for the gaming apparatus and draws more attention to the symbols appearing on media strip 80.

Communicating Game Information Using Light-Emitting Diodes Having Various Colors LEDs are available in a wide variety of colors. For example, LEDs are available in red, blue, green, red, amber, yellow, violet and white colors. Colored LEDs can be used in a gaming device and can be incorporated into gaming methods utilized by the gaming device.

Figure 8:
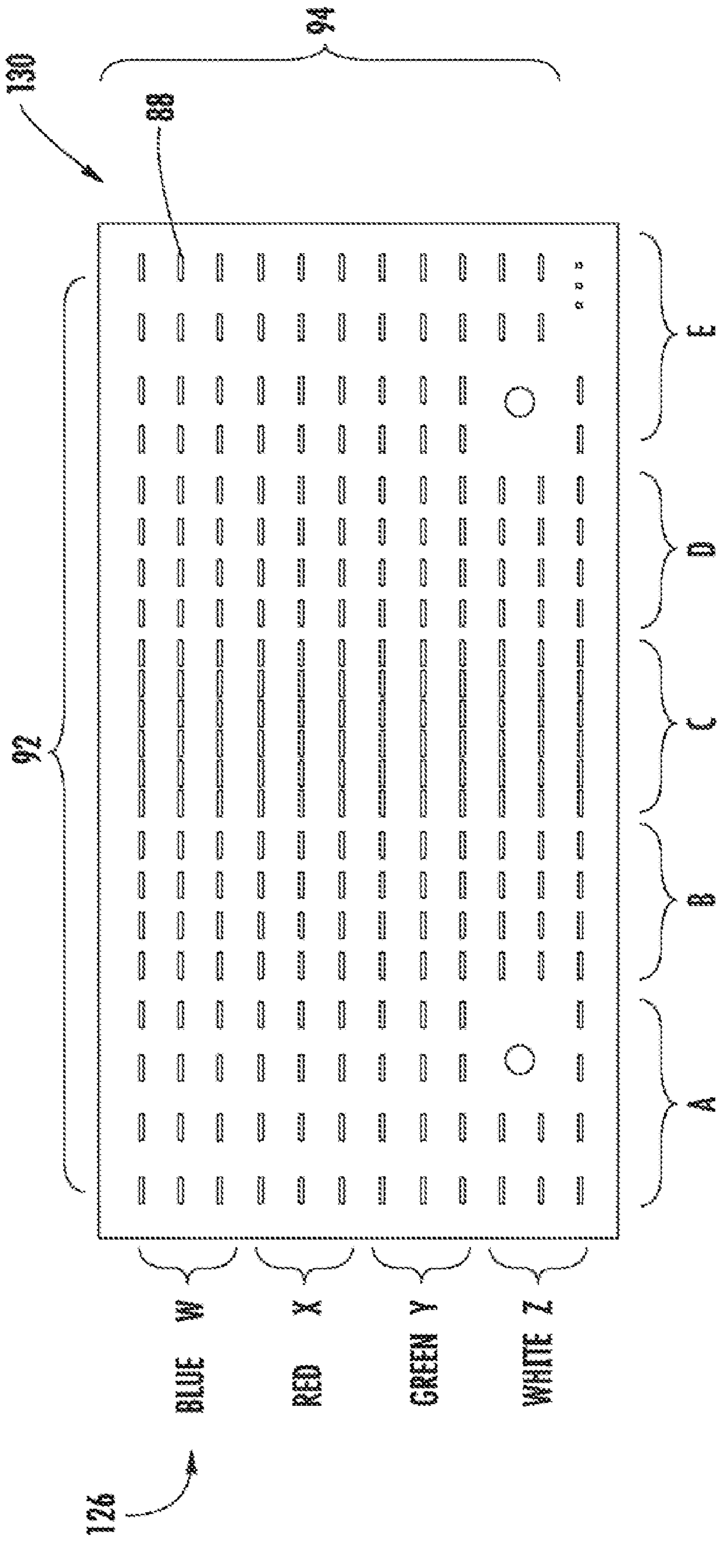
FIG. 8 is substantially a front elevational view of an LED board having various light-emitting diode colors.

With reference now to FIG. 8, a board 130 is shown having light-emitting diodes with various colors. Board 130 is similar to board 63 (FIG. 4) previously described and can be used with reel device 60 (FIGS. 2 and 3).

LEDs 88 may be arranged in rows 92 and columns 94 to define a matrix 126. Board 130 may be divided into matrix portions W, X Y and Z. Matrix portions W through Z may have various colors of light-emitting diodes. For example, matrix portion W may have blue LEDs 88. Matrix portion X may have may have red LEDs 88. Matrix portion Y may have may have green LEDs 88 and matrix portion Z may have may have white LEDs 88. Matrix portions W through Z may have various densities of LEDs 88 or may have the same density of LED's 88 across board 130.

The use of various colored LEDs 88 during a game can be used to communicate game information or to communicate a game outcome. Tuning now to FIG. 9, a front view of three reels 37 (FIGS. 1-3) of gaming device 20 (FIG. 1) are shown. Reel 37A is shown with a cherry indicium 41A. Reel 37B is shown with a bar indicium 41B. Reel 37C is shown with a star indicium 41C that is backlit a red color. Red star indicia 41C is colored red by applying electrical power to red LEDs 88 in matrix portion X (FIG. 8).

Figure 9:
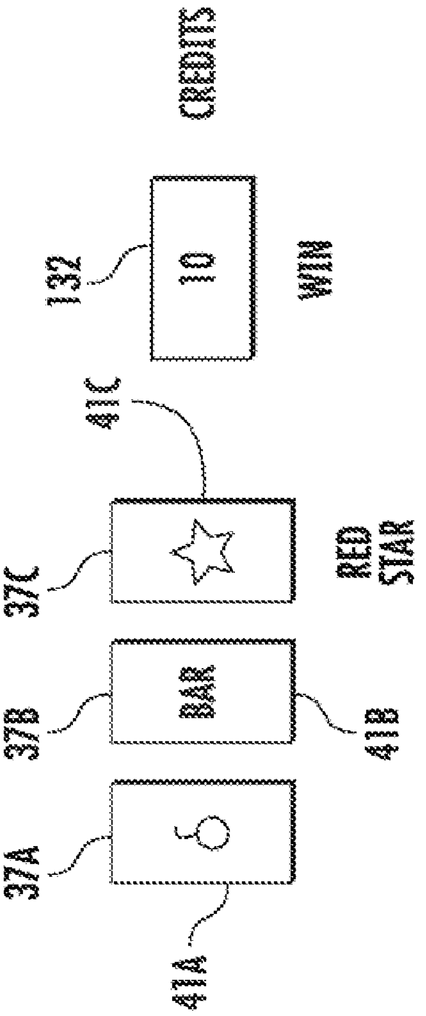
FIG. 9 is substantially a front view of several gaming reels showing a game outcome.

As shown in FIG. 9, only reel 37C is illuminated using red LEDs 88. Each color of LEDs can be associated with an additional prize or game outcome. For example, the combination of indicia 41 in FIG. 9 would normally not result in a prize being awarded. However, because red star indicium 41C is illuminated, an additional or bonus prize of 10 credits may be awarded to a game player. The additional or bonus credits may be displayed on a bonus credit meter 132.

Figure 10:
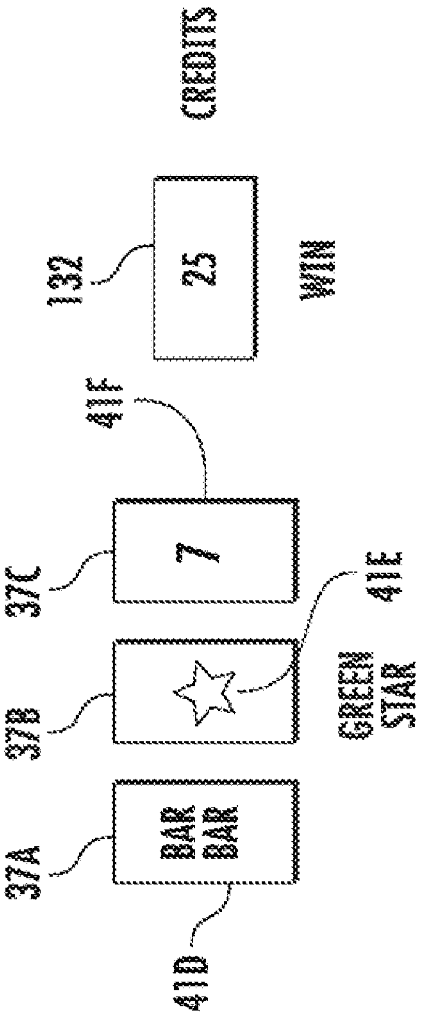
FIG. 10 is substantially a front view of several gaming reels showing another game outcome.

Tuning now to FIG. 10, a front view of three additional reels 37 (FIG. 1-3) of gaming device 20 (FIG. 1) are shown. Reel 37A is shown with a bar bar indicium 41D. Reel 37B is shown with a star indicium 41I that is backlit a green color. Reel 37C is shown with a 7 indicium 41F. Green star indicium 41E is colored green by applying electrical power to green LEDs 88 in matrix portion Y (FIG. 8).

As shown in FIG. 10, only reel 37B is illuminated using green LEDs 88. Each color of LEDs can be associated with an additional prize or game outcome. For example, the combination of indicia 41 in FIG. 10 would normally not result in a prize being awarded. However, because green star indicium 41E is illuminated, an additional or bonus prize of 25 credits may be awarded to a game player. The additional or bonus credits may be displayed on a bonus credit meter 132.

The use of different colors of LEDs 88 can communicate to a game player playing gaming device 20 (FIG. 1) additional game information such as an award, an additional award, a multiplier or that the game player has qualified to play a bonus game.

Lighting Effects Using Backlit Flexible Belts

Figure 11:
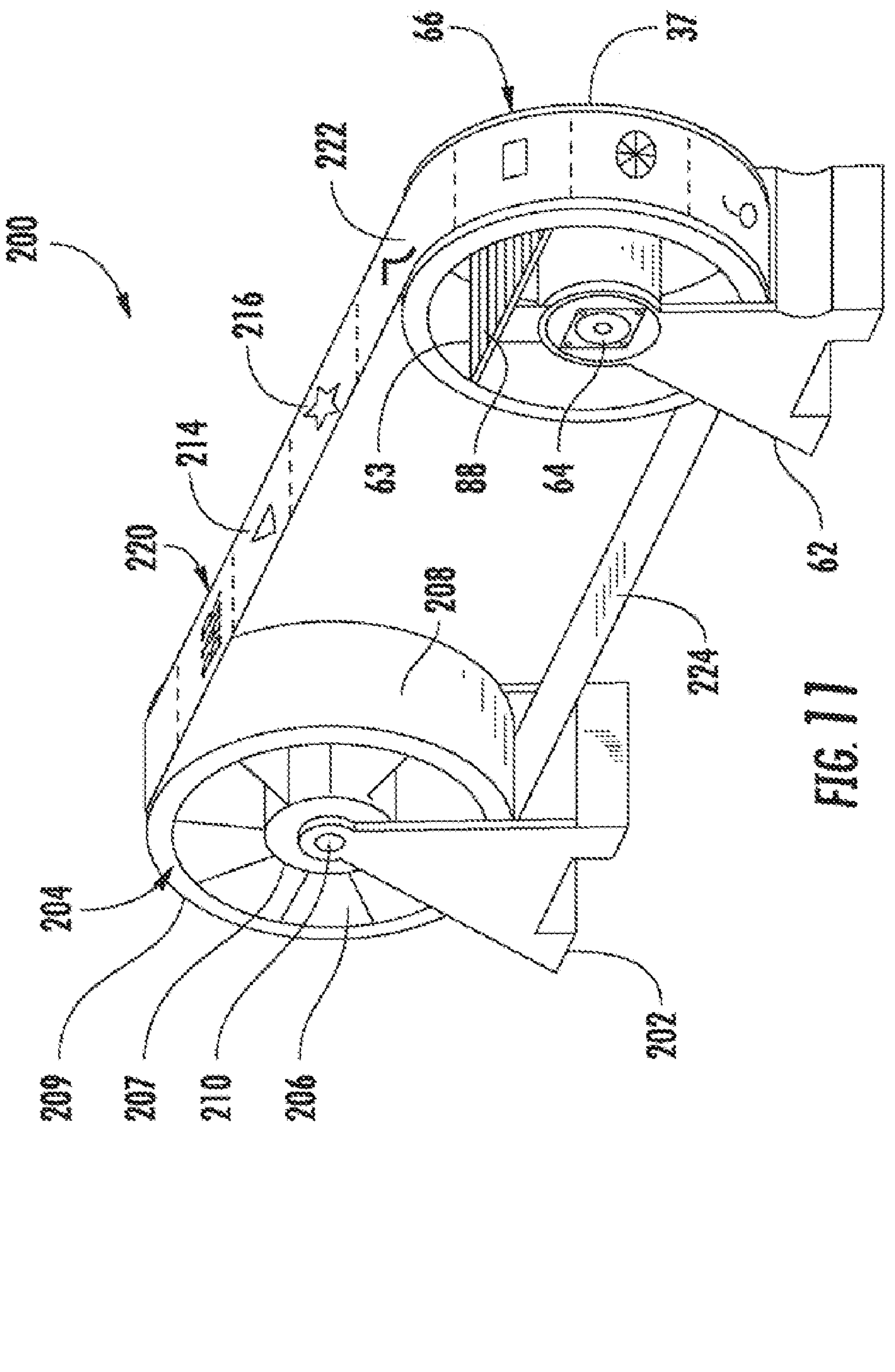
FIG. 11 is substantially a perspective view of the lighting system of FIG. 2 used to backlight a flexible belt.

Turning now to FIG. 11, another embodiment of a reel device 200 is shown. Reel device 200 is similar to reel device 60 (FIGS. 2 and 3) except that media strip 80 (FIGS. 2 and 3) has been replaced by a flexible belt 220 and a second reel 204 has been added.

Reel device 200 can include another chassis 202 that rotatably supports reel 204. Reel 204 may have spokes 206 that extend from a hub 207 to an outer rim 209. Reel 204 may further have a reel circumference 208. Reel 204 can rotate about a bearing 210 that is mounted in hub 207 and supported on each end by chassis 202.

A flexible belt or flexible belt 220 may be attached between reels 37 and 204. Flexible belt 220 has an outer surface 222 and an inner surface 224. Flexible belt 220 is supported by and rotates over reel circumferences 66 and 208. Flexible belt 220 may have sections 214 showing various types of images, such as indicia or symbols 216.

A tensioning mechanism (not shown) may be used to provide the proper amount of tension on flexible belt 220 between reels 37 and 204. Flexible belt 220 may be made of any suitable material, including plastic films, rubber and the like. It may be desirable for at least a portion of flexible belt 220 to be at least partially translucent, in order to allow light to pass through. Of course, the extent and degree of translucency, transparency, or opacity may be selected as desired by the one of skill in the art and still fall within the scope of the present invention.

Flexible belt 220 can be made in almost any size or length. Flexible belt 220 can be made to have a long length such that a large number of different symbols 216 can be displayed on flexible belt 220. The use of flexible belt 220 allows a larger number of symbols 216 to be displayed than can be displayed on media strip 80 (FIGS. 2 and 3).

Reel motor 64 can rotate reel 37, causing flexible belt 220 to move, and in turn causing reel 204 to also rotate. Reel device 200 can be used in place of, and in the same manner as, reel device 60 in gaming device 20 (FIG. 1) as previously described. Flexible belt 220 can be backlit by LEDs 88 in order to display game information or a game outcome to a game player. Controller 32 (FIG. 1) can control the movement and position of flexible belt 220.

Although the description above contains many specifications, these should not be construed as limiting the scope of the invention but as merely providing illustrations of certain embodiments of this invention. Thus, the scope of the invention should be determined by the appended claims and their legal equivalents rather than by the examples given.

What is claimed is:

1. A reel device comprising:

(A) a chassis;

(B) an actuator attached to the chassis;

(C) a reel structure rotatably attached to the chassis, the reel structure comprising:

(a) a hub;

(b) a frame defining the periphery of the reel structure, the periphery of the reel structure comprising media adapted to display a symbol to a game player;

(D) a board attached to the chassis; and (E) a plurality of light emitting diodes positioned on the board, wherein the plurality of light emitting diodes are adapted to transmit light to at least a portion of the media, the plurality of light emitting diodes comprising:

(a) at least one first light emitting diode that projects light into a first beam angle relative to the first light emitting diode; and (b) at least one second light emitting diode that projects light into a second beam angle relative to the second light emitting diode, wherein the second beam angle is different to the first beam angle.

2. The reel device of claim 1, wherein at least a portion of the plurality of light emitting diodes have a different output power level than another portion of the plurality of light emitting diodes.

3. The reel device of claim 1, wherein the plurality of light emitting diodes are more densely spaced in one portion of the board than another portion of the board.

4. The reel device of claim 1, wherein at least a portion of the plurality of light emitting diodes emit different colors than another portion of the plurality of light emitting diodes.

5. The reel device of claim 1, wherein a first color light emitting diode is configured to communicate a first game outcome when illuminated.

6. The reel device of claim 1, wherein the media comprises a flexible belt disposed around at least two reels that rotate on respective axes that are displaced from each other.

7. The reel device of claim 1, further comprising a controller in communication with the light emitting diodes, wherein the controller selectively illuminates the light emitting diodes.

8. The reel device of claim 1 wherein the plurality of light emitting diodes are configured on the board so that a first symbol of the media can be illuminated with one or more light emitting diodes of the at least one first light emitting diodes and a second symbol of the media can be simultaneously illuminated with one or more light emitting diodes of the at least one second light emitting diodes to create a different display effect between the first symbol and the second symbol.

9. A method for awarding prizes comprising, but not necessarily in the order shown:

(A) providing a gaming device, the gaming device comprising at least a first mechanical spinning wheel, the first wheel rotatable about an axis, the first wheel comprising translucent media, a board mounted inside the first wheel, the board comprising a plurality of light emitting diodes comprising at least one first light emitting diode that projects light at a first power level into a first beam angle relative to the first light emitting diode and at least one second light emitting diode that projects light at a second power level into a second beam angle relative to the second light emitting diode, wherein the second beam angle is different to the first beam angle;

(B) determining a game outcome;

(C) rotating the wheel, the wheel having a portion viewable by a player;

(D) illuminating at least a portion of the light emitting diodes;

(E) stopping the mechanical reel in accordance with the game outcome; and (F) awarding a prize to the player if the game outcome is a winning event.

10. The method of claim 9, wherein the media comprises a flexible belt disposed around at least two reels that rotate on respective axes that are displaced from each other.

11. The method of claim 9, wherein at least a portion of the illuminated light emitting diodes appear colored.

12. The method of claim 11, wherein the color of the illuminated symbol is correlated to a prize the player may be awarded.

13. The method of claim 9 comprising illuminating a first symbol of the media with one or more light emitting diodes of the at least one first light emitting diodes and simultaneously illuminating a second symbol of the media with one or more light emitting diodes of the at least one second light emitting diodes to create a different display effect between the first symbol and the second symbol.

14. A reel device comprising:

(A) reel means for displaying a media;

(B) chassis means for supporting the reel means;

(C) actuator means for moving the reel means; and (D) light means for illuminating the media, the light means comprising at least one first light emitting diode having a first beam angle relative to the first light emitting diode and at least one second light emitting diode having a second beam angle relative to the second light emitting diode, wherein the second beam angle is different to the first beam angle.

15. The reel device of claim 14, wherein the light means further comprises a first output power and a second output power.

16. The reel device of claim 14, wherein the light means further comprises a printed circuit board and a plurality of light emitting diodes mounted on the printed circuit board.

17. The reel device of claim 14, wherein the light means further comprises a plurality of colors.

18. The reel device of claim 17, wherein a first color light emitting diode is configured to communicate a first game outcome when illuminated.

19. The reel device of claim 14, wherein the reel means further comprises a flexible belt disposed around at least two reels that rotate on respective axes that are displaced from each other.

20. The reel device of claim 19, wherein the flexible belt includes a plurality of indicia, at least one of the indicia conveying a game outcome.

* * * * *